(12) United States Patent  (10) Patent No.: US 9,147,405 B2
Smith  (45) Date of Patent: Sep. 29, 2015

(54) LIGHT SOURCE ALIGNMENT

(71) Applicant: Seagate Technology LLC, Cupertino, CA (US)

(72) Inventor: Ralph Kevin Smith, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 118 days.

(21) Appl. No.: 14/097,669

(22) Filed: Dec. 5, 2013

(65) Prior Publication Data

US 2015/0162025 A1  Jun. 11, 2015

(51) Int. Cl.
 G01B 11/26 (2006.01)
 G11B 5/127 (2006.01)
 G11B 5/00 (2006.01)

(52) U.S. Cl.
 CPC .............. G11B 5/1272 (2013.01); G01B 11/26 (2013.01); G11B 2005/0021 (2013.01)

(58) Field of Classification Search
 CPC ................ G01B 11/26; G11B 5/1272; G11B 2005/0021
 USPC .................................... 33/228, 286
 See application file for complete search history.

(56) References Cited

U.S. PATENT DOCUMENTS

| | | | |
|---|---|---|---|
| 7,773,342 B2 | 8/2010 | Shimazawa et al. | |
| 8,023,365 B2 | 9/2011 | Hongo et al. | |
| 8,149,563 B2 | 4/2012 | Huang | |
| 8,194,509 B2 | 6/2012 | Shimazawa et al. | |
| 8,248,892 B2 | 8/2012 | Shimazawa et al. | |
| 8,270,791 B2 | 9/2012 | Komura et al. | |
| 8,325,566 B2 | 12/2012 | Shimazawa et al. | |
| 8,406,091 B2 | 3/2013 | Shimazawa et al. | |
| 8,424,191 B2 | 4/2013 | Shimazawa et al. | |
| 8,441,895 B2 | 5/2013 | Shimazawa et al. | |
| 2007/0177302 A1 | 8/2007 | Shimazawa et al. | |
| 2008/0080039 A1 | 4/2008 | Hongo et al. | |
| 2010/0238580 A1 | 9/2010 | Shimazawa et al. | |
| 2011/0026377 A1 | 2/2011 | Shimazawa et al. | |
| 2011/0122737 A1 | 5/2011 | Shimazawa et al. | |
| 2011/0157738 A1 | 6/2011 | Shimazawa et al. | |
| 2011/0205864 A1* | 8/2011 | Huang et al. ............... | 369/13.33 |
| 2011/0228653 A1 | 9/2011 | Shimazawa et al. | |
| 2012/0008470 A1 | 1/2012 | Shimazawa et al. | |
| 2012/0044790 A1 | 2/2012 | Shimazawa et al. | |
| 2012/0072931 A1* | 3/2012 | Imada et al. .................. | 720/672 |
| 2012/0092973 A1* | 4/2012 | Imada et al. ............... | 369/13.32 |
| 2013/0250742 A1* | 9/2013 | KOMURA et al. ......... | 369/13.32 |
| 2015/0036468 A1* | 2/2015 | Boone, Jr. .................. | 369/13.32 |

* cited by examiner

Primary Examiner — G. Bradley Bennet

(74) Attorney, Agent, or Firm — HolzerIPLaw, PC

(57) ABSTRACT

Implementations disclosed herein provide a method comprising emitting light at a plurality of locations across a surface of a recording head assembly, detecting, using a detector not positioned along a waveguide axis, light output from a diffraction grating positioned along the waveguide axis, and determining a target position for mounting a laser source on the surface a recording head assembly by analyzing the detected light output corresponding to one or more of the plurality of locations.

20 Claims, 4 Drawing Sheets

LIGHT SOURCE ALIGNMENT

SUMMARY

Implementations disclosed herein include a method comprising emitting light at a plurality of locations across a surface of a recording head assembly (RHA), detecting light output from a diffraction grating positioned along a waveguide axis using a detector external to the RHA, and determining a position for mounting a laser source on the surface of the RHA by analyzing the detected light output corresponding to one or more of the plurality of locations.

This Summary is provided to introduce a selection of concepts in a simplified form that are further described below in the Detailed Description. Other implementations are also described and recited herein. This Summary is not intended to identify key features or essential features of the claimed subject matter, nor is it intended to be used to limit the scope of the claimed subject matter. These and various other features and advantages will be apparent from a reading of the following detailed description.

DETAILED DESCRIPTIONS

Figure 1:
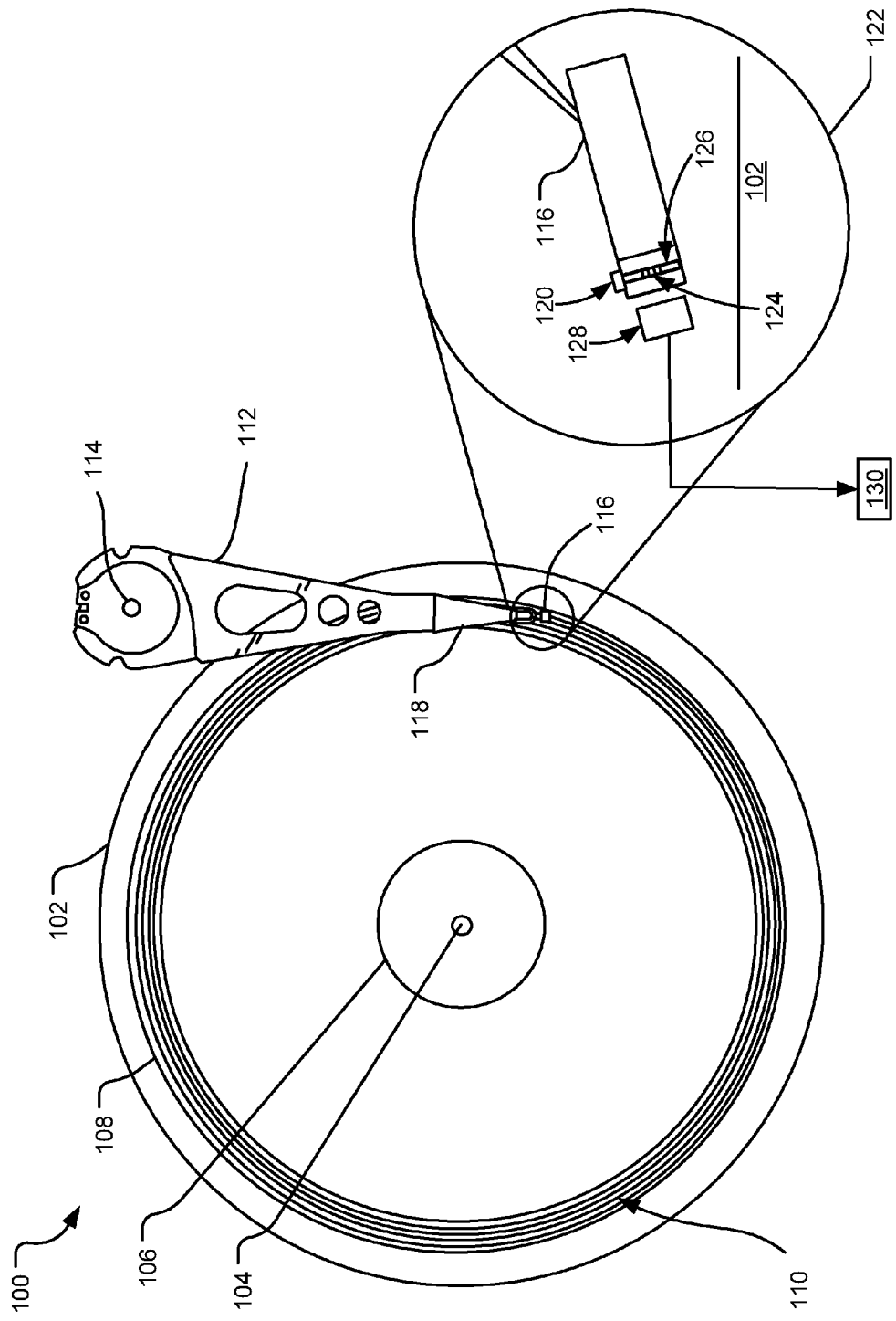
FIG. 1 illustrates an example hard disc drive system, that includes a diffraction grating integrated within a waveguide of a recording head, in accordance with one implementation.

Implementations of the technology disclosed herein may be employed in the context of a data storage system, although other applications may also be contemplated for active laser alignment using diffraction grating.

Heat assisted magnetic recording (HAMR) technology generally refers to the concept of heating a recording medium to increase data density by reducing the coercivity of the medium. Such reduced coercivity allows the applied magnetic writing fields to more easily direct the magnetization within the recording medium during the temporary magnetic softening caused by the heat source. HAMR allows for the use of small grain media, with a larger magnetic anisotropy at room temperature to assure sufficient thermal stability, which is desirable for recording at increased areal densities. By heating a medium, the coercivity is reduced such that the magnetic write field is sufficient to write to the medium. Once the media cools to ambient temperature, the coercivity has a sufficiently high value to assure thermal stability of the recorded information.

During HAMR, the medium is irradiated and heated with a light source. A light source, such as a laser diode, is configured on a recording head assembly (RHA) on a surface opposite of the ABS. A recording head in the RHA includes a waveguide. A near field transducer (NFT) attached to the waveguide may be configured to convert the light energy into heat energy and to focus the heat energy onto a grain on the recording medium.

The HAMR technology requires accurate alignment of laser emission to the waveguide in the recording head. It is necessary to have a high amount of energy from the light source transmitted to the NFT to increase the efficiency of the HAMR system. Furthermore, lack of alignment may result in heating of other parts of the recording head with potentially detrimental side effects.

One implementation to achieve high alignment accuracy between the light source and the waveguide uses active light source alignment, which involves moving, or sweeping, a light source relative to the waveguide while monitoring light output. The light source is swept in a search pattern until peak light output is detected for determination of a desired position at which the substantially highest light intensity is obtained. In an alternative implementation, the sweeping can be made in various patterns (e.g., zig-zag, cross-hatch, etc.).

The disclosed technology includes a method of emitting light from a light source (e.g., a laser diode), at a plurality of locations across a surface of a RHA. The RHA includes a diffraction grating integrated in the waveguide. Alternatively, the diffraction grating may be positioned adjacent the waveguide at a location before or after the waveguide along the waveguide axis.

An implementation of a RHA using HAMR includes a detector for detecting the light deflected by the diffraction grating. In one implementation, such detection is configured external to the RHA. However, in alternative implementations, the detector may be configured within the RHA.

The detector detects light output from the diffraction grating. In one implementation, the detector may be positioned perpendicular to the axis of the waveguide. In alternative implementations, the detector may be positioned at one of various angles other than a perpendicular angle in relation to the axis of the waveguide. In such an implementation, the diffraction grating may be configured to deflect light at such a non-perpendicular angle where the detector is positioned. The detector detects light deflected by the diffraction grating and the magnitude of the light detected at the detector may correspond to the location of the light source at one or more of the plurality of locations on the surface of the RHA.

A control circuit is connected to the detector, and receives signals representing the detected light output corresponding to one or more of the plurality of locations of the light source on the surface of the RHA. The control circuit stores the signals and analyzes the signals for determination of the desired position. The control circuit communicates the desired position to a mounting assembly for mounting the light source on the RHA.

The disclosed method eliminates any effects of stray light from a misaligned laser, which may give a false reading at the detector, by incorporating a diffraction grating in the desired light path. The diffraction grating deflects the light that is coupled into the desired light path. Thus, when the diffraction grating is positioned in the waveguide, the diffraction grating reflects the light that is coupled into the waveguide. Therefore, any extraneous or stray light is not detected at the detector. For example, when the light source is substantially aligned with the waveguide, the light from the light source, passing through the waveguide is deflected by the diffraction grating. However, when the light source is not aligned with the waveguide, no light from the light source is deflected by the diffraction grating. After the desired position is determined, the light source can be mounted in the manufacturing process for future use.

Referring now to FIG. 1, an example hard disc drive system 100, in accordance with one implementation, is shown. A disc 102 rotates about a spindle center or a disc axis of rotation 104 during operation. The disc 102 includes an inner diameter 106 and an outer diameter 108 between which are a number of concentric data tracks 110. It should be understood, however, that the described technology may be employed with a variety of systems and types of storage media (e.g., continuous magnetic media, heat-assisted magnetic recording media, patterned magnetic media, or discrete track media).

Information may be written to and read from the disc 102 in different data tracks 110. A transducer head, including a recording head 116, is mounted on an actuator assembly 112 at an end distal to an actuator axis of rotation 114 and the recording head 116 flies in close proximity above the surface of the disc 102 during a disc operation. The actuator assembly 112 rotates during a seek operation about the actuator axis of rotation 114 positioned adjacent to the disc 102. The seek operation positions the recording head 116 over a target data track of the data tracks 110.

The exploded view 122 in FIG. 1 shows a side view of an example trailing edge of the recording head 116 (not drawn to scale). The recording head 116 is supported by a suspension 118 (shown in hard disc drive system 100) extending from the arm of the actuator assembly 112. A light source 120 delivers light to a diffraction grating 124, which is integrated within a waveguide (or desired light path) 126, which is integrated within the recording head 116. During the manufacturing of the recording head 116, the light source 120 is moved or swept across the top surface of the recording head (opposite the surface of the recording head facing the disc 102). At various locations of the light source 120, the light deflected by the diffraction grating 124 is measured using a detector 128 (e.g., a photodetector).

A control circuit 130 is connected to the detector 128, and receives signals representing detected light output from the detector 128 corresponding to one or more of the plurality of locations of the light source 120 on the recording head 116. The control circuit 130 stores the signals and analyzes the signals for determination of a desired position of the light source 120 on the recording head 116. The analysis by the control circuit 130 may include determining a substantially global maximum value of signal generated by the detector 128. Alternatively, the analysis may also involve removing outlier signals, comparing a number of local maximum points with each other to determine the substantially global maximum, etc. The control circuit 130 communicates the desired position of a mounting assembly to mount a light source on the recording head 116 for precise alignment of the light source with the waveguide 126.

Figure 2A:
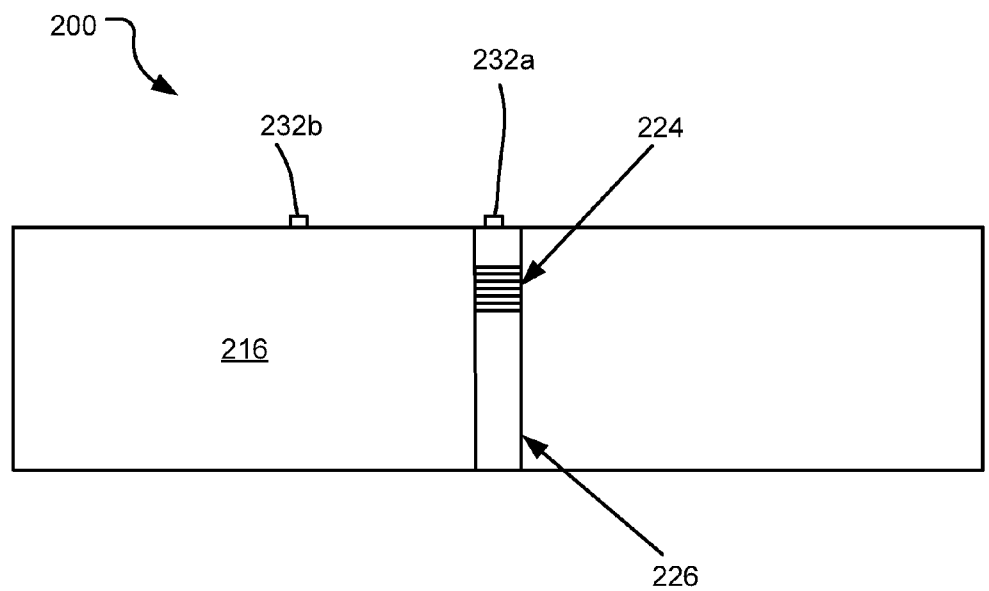
FIG. 2a illustrates a trailing view of an example recording head assembly (RHA) with a diffraction grating integrated within a waveguide of a recording head, in accordance with one implementation.

FIG. 2a illustrates a trailing edge view of an example RHA 200, in accordance with one implementation. A diffraction grating 224 is integrated in a waveguide 226. The waveguide 226 is integrated near the trailing edge of a recording head 216. By using the diffraction grating 224 positioned in the waveguide 226, only light from a light source (not shown) located at location 232a and coupled into the waveguide 226 may be deflected. On the other hand, if the light source is located at a position that is not aligned with the waveguide 226, such as location 232b, the light generated from the light source is not reflected by diffraction grating 224.

Figure 2B:
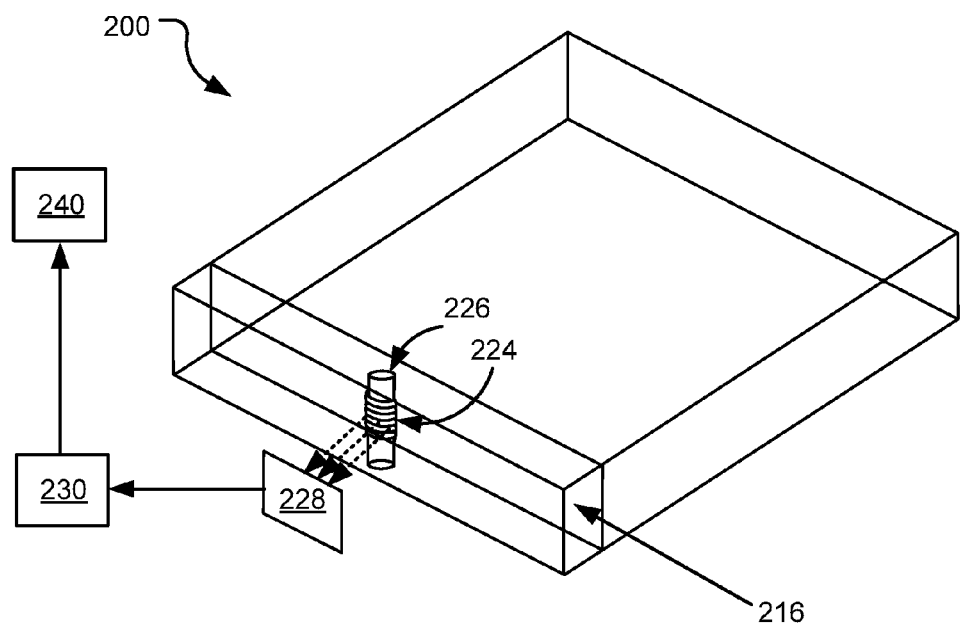
FIG. 2b illustrates a perspective, cross-sectional view of an example RHA, with a diffraction grating integrated within a waveguide of a recording head, a detector, and a light source, in accordance with one implementation.

FIG. 2b illustrates a perspective, three-dimensional view of an RHA 200, in accordance with one implementation. The diffraction grating 224 is integrated in the waveguide 226. In one implementation, a detector 228 is positioned externally and apart from the recording head 216. The detector 228 may detect only light that is coupled into the waveguide 226 and deflected by the diffraction grating 224. The detector 228 communicates the signals representing the amplitude of detected light to a control circuit 230. The control circuit 230 stores and analyzes the signals and determines a desired position for mounting a light source on the surface of the recording head 116. The control circuit 230 communicates the information about the desired mounting position of the light source to a mounting assembly 240.

Figure 3:
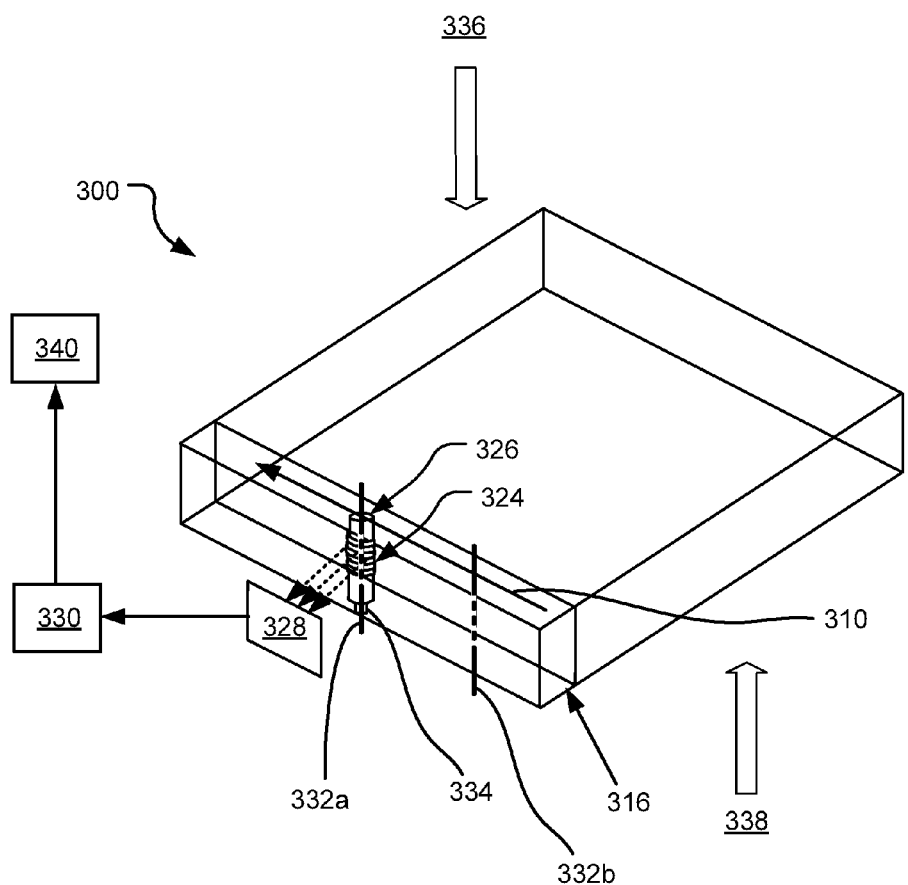
FIG. 3 illustrates a perspective, cross-sectional view of an alternative example RHA, with a diffraction grating integrated within a waveguide of a recording head, a detector, and a light source, in accordance with one implementation.

FIG. 3 illustrates a RHA 300 that is used to align a light source (not shown) on a surface thereof. Specifically, the RHA 300 includes a top surface 336 where a light source is mounted and a bottom surface 338 that faces a secondary medium. The recording head 316 includes a waveguide 326 that is configured near a trailing edge and a diffracting grating 324 that is configured within the waveguide 326. The waveguide 326 is configured to receive light from a light source mounted on the top surface 336 and to propagate the light to an NFT 334 located near the bottom surface 338.

To determine the desired location on the top surface 336 where the light source should be mounted, light source is moved along the top surface 336 in a search pattern, as represented by the line 310. Alternatively, the search pattern may be in the form of a zig-zag pattern, a cross-hatch pattern, etc. For each of various locations of the light source along the search pattern, an output from a detector, such as a photodetector 328 is measured.

In one implementation, the detector 328 may be located at a location external to the RHA 300 such that it detects light deflected by the diffraction grating 324. For example, the detector 328 may be configured perpendicular to the axis of the waveguide 326.

When the light source is located along the search pattern at a location 332b, it is not aligned with the waveguide 324, and therefore, the diffraction grating 324 will not deflect any light to the detector 328. On the other hand, when the light source is located at a location 332a, the light source is aligned with the waveguide 326 resulting in measurable amount of light being deflected by the diffraction grating 324 to the detector 328.

The detector 328 measures the deflected light and communicates it to a control circuit 330. The control circuit 330 analyzes the signals from the deflector 328 for various locations on the top surface 336 to determine a desired location where the light source should be mounted. The information about the desired location is communicated to a mounting assembly 340.

Figure 4:
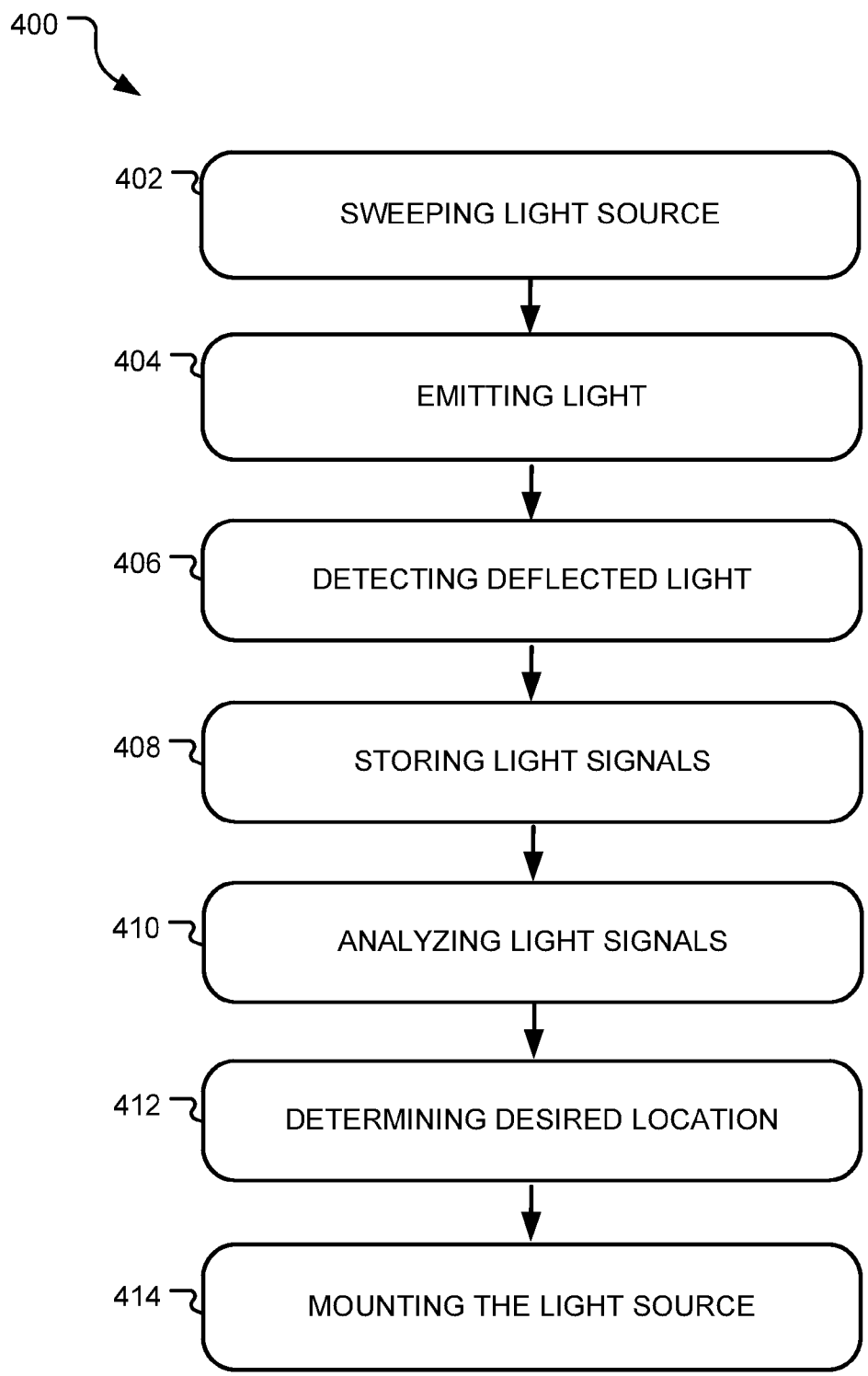
FIG. 4 illustrates example operations for determining a desired position for laser alignment using diffraction grating integrated within a waveguide of a recording.

Referring now to FIG. 4, example operations 400 of a method for light source alignment using a diffraction grating are shown. A sweep operation 402 sweeps a light source across a surface of a RHA where the light source is to be mounted. In one implementation, the sweep operation 402 sweeps the light source in a zig-zag pattern. However, alternative sweep patterns may be employed. At each location along the sweep pattern, an emission operation 404 emits light into the RHA. A detector detects diffracted light from the diffraction grating, positioned in the waveguide, in a detection operation 406.

The signals generated by the detection operation 406 are stored in a storing operation 408 and then analyzed in an analysis operation 410. In one implementation, both the storing operation 408 and analysis operation 410 occur in a control circuit. The control circuit may be located on a hard disc drive assembly or in a manufacturing system used to manufacture the RHA. A desired position for light alignment is then determined in a decision operation 412. For example, the desired location of the light source may be the location of the light source along the sweep pattern that corresponds to substantially maximum amount of signal generated by the detection operation 406. Once the desired position for locating the light source is determined, a mounting operation 414 occurs, which includes assembly of a light source at the desired position on the RHA for post-manufacturing use.

It is to be understood that even though numerous characteristics and advantages of various implementations of the present invention have been set forth in the foregoing description, together with the details of the structure and function of various implementations of the invention, this disclosure is by way of example only, not by limitation. The diffraction and detection concepts herein are not limited to use or application with any specific system or method that employs the components as specifically arranged in the illustrative implementations of the disclosure. That is, although the instrumentalities described herein are for the convenience of explanation, shown and described with respect to exemplary implementations, it will be appreciated that the principles herein may be applied equally in other types of systems and methods.

The implementations described above and other implementations are within the scope of the following claims.

What is claimed is:

1. A method comprising:
   emitting light at a plurality of locations across a surface of a recording head;
   detecting light output from a diffraction grating axis with a detector positioned externally to the recording head; and
   determining a target position for mounting a light source on the surface of the recording head by analyzing the detected light output corresponding to one or more of the plurality of locations.

2. The method of claim 1, wherein a data produced from the detected light output is stored and analyzed by a control circuit connected to the detector.

3. The method of claim 1, wherein the light source is a laser diode.

4. The method of claim 1, wherein the diffraction grating is positioned in the waveguide.

5. The method of claim 1, wherein the diffraction grating is positioned adjacent before or after the waveguide along the waveguide axis.

6. The method of claim 1, wherein the detector is positioned substantially perpendicular to an axis of the waveguide.

7. The method of claim 1, wherein the diffraction grating is positioned at a degree other than perpendicular to an axis of the waveguide.

8. The method of claim 1, wherein the diffraction grating is configured to deflect light at a first angle other than perpendicular to an axis of the waveguide.

9. The method of claim 8, wherein the detector is configured to detect light output from the diffraction grating at the first angle.

10. The method of claim 1, further comprising communicating the target position to a mounting assembly.

11. The method of claim 10, further comprising mounting a light source at the target position using a mounting assembly.

12. The method of claim 1, wherein emitting light at a plurality of locations further comprises emitting light in a zig-zag sweeping pattern across a top surface of the recording head.

13. A system comprising:
   a recording head assembly;
   a light source, configured to deliver light to a plurality of locations on the recording head assembly;
   a waveguide positioned in the recording head assembly, wherein the waveguide is configured to receive light from the light source;
   a diffraction grating, wherein the diffraction grating is configured to diffract light;
   a detector positioned externally to the slider, wherein the detector detects light output from the diffraction grating;
   a control circuit connected to the detector, wherein the control circuit stores and analyzes the detected light output corresponding to one or more of the plurality of locations to determine a desired position to mount a light source on the recording head assembly.

14. The system of claim 13, wherein the light source is a laser diode.

15. The system of claim 13, wherein the diffraction grating is positioned in the waveguide.

16. The system of claim 13, wherein the detector is positioned substantially perpendicular to the waveguide axis.

17. The system of claim 13, wherein the diffraction grating is positioned at a degree other than perpendicular to an axis of the waveguide.

18. The system of claim 13, wherein the diffraction grating is configured to deflect light at a first angle other than perpendicular to an axis of the waveguide.

19. The system of claim 18, wherein the detector is configured to detect light output from the diffraction grating at the first angle.

20. The system of claim 19, further comprising communicating the target position to a mounting assembly.

* * * * *